United States Patent
Brown et al.

(10) Patent No.: US 9,114,867 B2
(45) Date of Patent: Aug. 25, 2015

(54) AIR VEHICLE MOUNTED TRANSMITTING OR RECEIVING EQUIPMENT

(75) Inventors: Robert Brown, Preston (GB); Peter Wayne Collingbourne, Preston (GB)

(73) Assignee: BAE SYSTEMS PLC, London (GB)

( * ) Notice: Subject to any disclaimer, the term of this patent is extended or adjusted under 35 U.S.C. 154(b) by 149 days.

(21) Appl. No.: 13/517,420

(22) PCT Filed: Dec. 22, 2010

(86) PCT No.: PCT/GB2010/052188
§ 371 (c)(1),
(2), (4) Date: Jun. 20, 2012

(87) PCT Pub. No.: WO2011/077152
PCT Pub. Date: Jun. 30, 2011

(65) Prior Publication Data
US 2012/0318919 A1    Dec. 20, 2012

(30) Foreign Application Priority Data

Dec. 23, 2009  (EP) ..................................... 09275132
Dec. 23, 2009  (GB) ................................... 0922443.7

(51) Int. Cl.
*B64D 1/00* (2006.01)
*B64C 7/00* (2006.01)
(Continued)

(52) U.S. Cl.
CPC . *B64C 7/00* (2013.01); *B64D 47/08* (2013.01); *G03B 15/006* (2013.01); *B64C 2201/127* (2013.01)

(58) Field of Classification Search
CPC ............ B64D 7/06; B64D 7/00; B64D 47/08; B64C 7/00; G03B 15/006
USPC ................... 244/120, 130, 53 B, 129.1, 1 R; 250/203.1, 203.6, 203.7, 239; 248/564, 248/585, 591, 595, 663
See application file for complete search history.

(56) References Cited

U.S. PATENT DOCUMENTS 1,881,073 A * 10/1932 Freeman ................... 244/103 R
1,894,582 A *  1/1933 De Bell ..................... 244/102 R
(Continued)

FOREIGN PATENT DOCUMENTS

FR        2875785 A1    3/2006
GB         458204 A   12/1936
WO    WO 2008/119144 A2  10/2008

OTHER PUBLICATIONS

International Search Report (PCT/ISA/210) issued on Feb. 17, 2011, by the European Patent Office as the International Searching Authority for International Application No. PCT/GB2010/052188.
(Continued)

*Primary Examiner* — Brian M O'Hara
*Assistant Examiner* — Jessica Wong
(74) *Attorney, Agent, or Firm* — Maine Cernota & Rardin (57) ABSTRACT

Disclosed is an air vehicle mounted or mountable transmitting and/or receiving equipment including a transmitting and/or receiving turret allowing at least a forward field of view, the device being mounted or mountable on a fuselage such that it extends away from the fuselage to which it is mounted; and a fairing mounted to the fuselage adjacent the device at a rearward side of the device for reducing aerodynamic drag, the fairing being retractable by, for example, an electrically driven mechanism, to afford the device a rearward (arrow R), or more effective rearward, field of view for transmitting and/or receiving.

18 Claims, 6 Drawing Sheets

(51) Int. Cl.
    B64D 47/08    (2006.01)
    G03B 15/00    (2006.01)

(56)             References Cited

U.S. PATENT DOCUMENTS

| 2,390,127 | A  | * | 12/1945 | Schneckloth | 244/110 G |
| 2,920,844 | A  | * | 1/1960  | Marshall | 244/207 |
| 3,386,688 | A  | * | 6/1968  | Clejan | 244/53 R |
| 3,693,913 | A  |   | 9/1972  | Barland, Sr. et al. | |
| 4,188,631 | A  | * | 2/1980  | Dougherty et al. | 343/705 |
| 5,806,789 | A  |   | 9/1998  | Boulware et al. | |
| 7,784,737 | B2 | * | 8/2010  | Lee et al. | 244/129.1 |
| 8,453,968 | B2 | * | 6/2013  | Dias Ferraz | 244/118.1 |
| 2006/0071134 | A1 | | 4/2006 | Dent et al. | |
| 2007/0063102 | A1 | * | 3/2007 | Lee et al. | 244/130 |
| 2008/0035794 | A1 | * | 2/2008 | Steinbeck et al. | 244/131 |
| 2009/0216394 | A1 | | 8/2009 | Heppe et al. | |
| 2009/0242702 | A1 | * | 10/2009 | Cain et al. | 244/129.4 |
| 2010/0219295 | A1 | * | 9/2010 | Dias Ferraz | 244/129.1 |

OTHER PUBLICATIONS

European Search Report issued May 28, 2010 for European Application No. 09275132.3.
Great Britain Search Report issued Apr. 22, 2010 for Great Britain Application No. 0922443.7.
Notification Concerning Transmittal of International Preliminary Report on Patentability (Forms PCT/IB/326 and PCT/IB/373) and the Written Opinion of the International Searching Authority (Form PCT/ISA/237) dated Jul. 5, 2012, issued in corresponding International Application No. PCT/GB2010/052188. (9 pages).

* cited by examiner

AIR VEHICLE MOUNTED TRANSMITTING OR RECEIVING EQUIPMENT

RELATED APPLICATIONS

This application is a national phase application filed under 35 USC §371 of PCT Application No. PCT/GB2010/052188 with an International filing date of Dec. 22, 2010 which claims priority of EP Patent Application 09275132.0 filed Dec. 23, 2009 and GB Patent Application 0922443.7 filed Dec. 23, 2009. Each of these applications is herein incorporated by reference in their entirety for all purposes.

FIELD OF THE INVENTION

This invention relates to air vehicle mounted transmitting and/or receiving equipment which includes transmitting and/or receiving devices used for observation, surveillance, reconnaissance, targeting, monitoring, inspection, measurement or like purposes, and associated fairings for use with such devices, herein collectively referred to as transmitting and/or receiving equipment.

BACKGROUND OF THE INVENTION

Where devices used for observation etc are employed on an aircraft, then it is desirable to have a good field of view. For observation cameras, this good field of view has been achieved by mounting the camera on an enclosed gimbal or turret on the underside of the aircraft, so that the camera is protruding from the underside of the aircraft and can swivel about one or more axes. This mounting provides a good field of view in all directions—forwardly in the usual direction of travel of the aircraft, rearwardly in a direction facing away from the usual direction of travel, and at intermediate positions. Such cameras are already available for helicopter use, for example under the name Wescam MX-20 and so development costs are saved if these "off-the-shelf" devices can be employed.

One drawback of having a protruding camera is that it increases aerodynamic drag significantly when the aircraft is travelling at speed. This is not too problematic for relatively slow moving aircraft such as helicopters or lighter than air aircraft, but where increased air speed is required then the drag becomes a significant problem. It is not practical to retract the camera into the aircraft fuselage if it is in use.

Unmanned air vehicles (UAVs), are generally used for observation. So, cameras fitted to such air vehicles are in use for the majority of their flight, and so retracting the camera is not practicable, and in any event generally precluded for reasons of space and weight. Thus the camera needs to be exposed for use, in a drag-inducing position. Similar considerations apply to equipment designed to transmit a beam of radiation as well as or instead of receiving, and the term "field of view" should be interpreted correspondingly.

SUMMARY OF THE INVENTION

In a first aspect the present invention provides transmitting and/or receiving equipment mounted or mountable to a fuselage of an air vehicle, the fuselage including, when viewed fore to aft, an underside having a generally linear initial portion, a further generally linear aft portion which is lower than the initial portion, and an intermediate portion between the initial and aft portions, the equipment is mounted or mountable to the intermediate portion such that the initial portion is forward of the equipment, and the aft portion is aft of the equipment, the equipment comprises: a device for transmitting and/or receiving allowing at least a forward field of view for the transmitting and/or receiving, said device being mounted or mountable at the intermediate portion such that it extends away from the fuselage; and a fairing mounted or mountable to the fuselage at the intermediate portion adjacent said device at a rearward side of the device for reducing aerodynamic drag, said fairing being retractable, collapsible or repositionable to afford the device a rearward, or more effective rearward, field of view for said transmitting and/or receiving.

In an embodiment, the fairing is of a generally tapering shape having a taller end adjacent or proximal the device and a thinner or shorter end away or distal from the device. Thereby, the fairing acts to reduce drag caused by the device alone, by reducing turbulent flow at the rear of the device.

In an embodiment, the fairing is retractable, at least partially into the fuselage.

Preferably, the fairing is retractable by means of pivoting at a hinge at its thinner end.

Preferably, the device has a horizontal width and the fairing, at least at its proximal end is approximately the same width as the device.

Preferably, the device has a cylindrical region including an axis which extends generally downwardly in use, and the fairing, at its proximal end, has, in horizontal section, a concave region for accepting part of the cylindrical region.

Additionally, the fairing's proximal end may be formed with a radius having a centre of arc approximately at the hinge.

Conveniently, the fairing includes an outer wall and is hollow and may include a stiffening frame, preferably formed from members extending generally transversely to the wall.

Where the fairing is retractable, it may include a retraction mechanism. Said mechanism may include an electric drive and bar arrangement. Such an arrangement may include two bars pivotally interconnected at adjacent ends, a first of the bars being driveable in rotation by rotation of the electric drive, and a second of the bars being further pivotally connected to the fairing. Where such a mechanism is employed, the rotation of the drive will cause the first of the bars to rotate about the rotational axis of the drive, and will thus cause the second bar to move with the first bar and thus pivot the fairing about the hinge.

The mechanism may include a gearbox.

In an embodiment, the two bar arrangement includes an overcentering spring which resists movement of the mechanism at least when the bars are positioned in a fairing-retracted position.

The invention extends to an air vehicle including equipment according to the invention as defined above, mounted to a fuselage of the vehicle.

In an embodiment, said fuselage includes an underside having a generally linear initial portion, when viewed fore to aft, forward of said equipment, a further generally linear aft portion, aft of said equipment which is lower than the initial portion, and an intermediate portion between the initial and aft portions, said equipment being mounted at said intermediate portion.

Preferably, said intermediate portion is smoothly curved and the fairing is retractable into the intermediate portion, and when so retracted has approximately the same outer profile as the intermediate portion.

The invention extends to any novel feature defined herein, or any novel combination of features defined herein.

BRIEF DESCRIPTION OF THE DRAWINGS

The invention can be put into effect in numerous ways, one embodiment only being described below, with reference to the drawings wherein.

DETAILED DESCRIPTION

Figure 1:
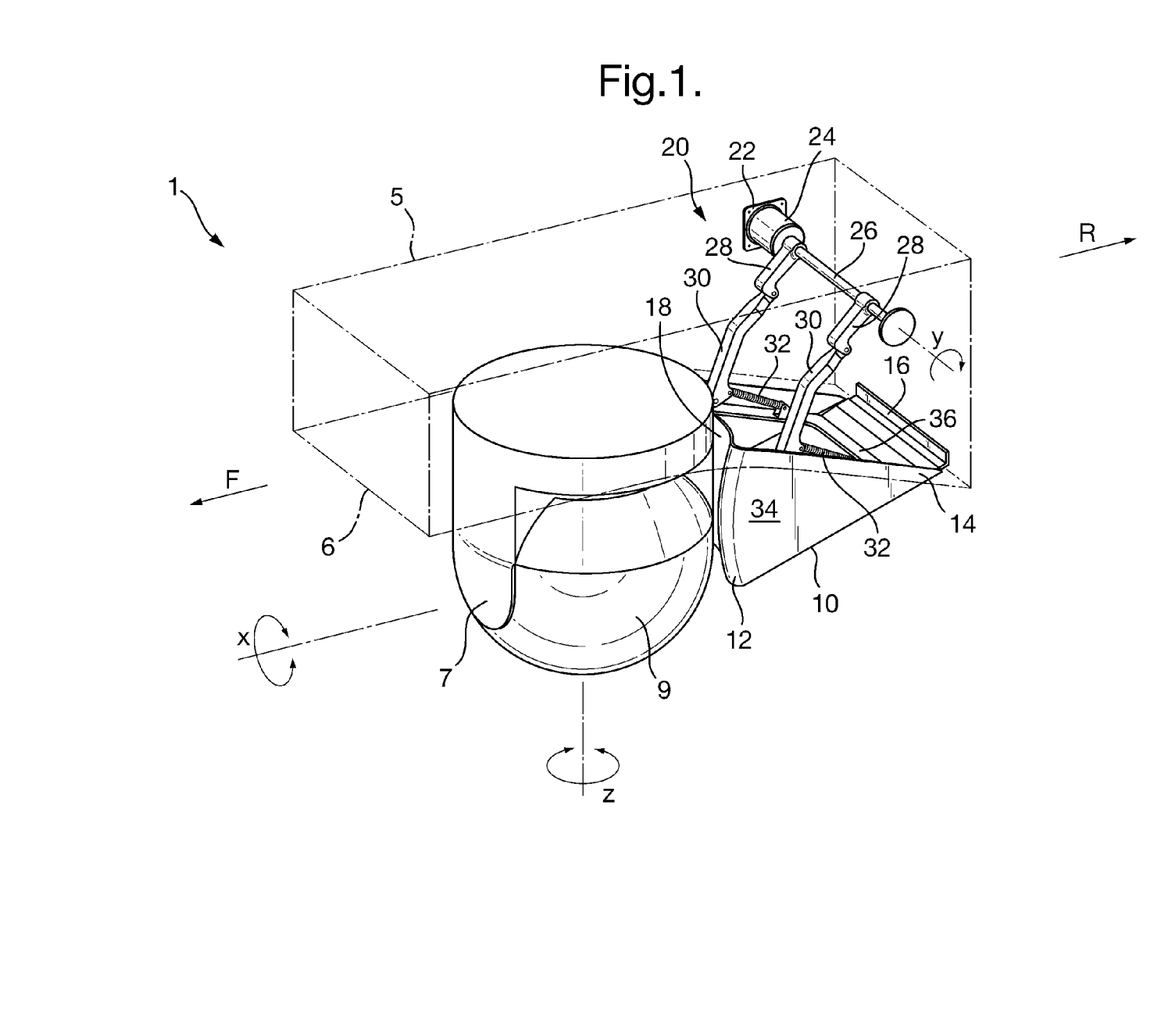
FIG. 1 shows an embodiment of air vehicle equipment including a fairing deployed in a drag-reducing capacity.

Referring to FIG. 1, a portion 5 of an air vehicle fuselage is schematically illustrated. Transmitting and/or receiving equipment 1 is illustrated also and is described in more detail below. The portion 5 has an under surface 6 to which is attached a transmitting and/or receiving device, in this instance an observation device, in the form of an electro-optical turret. The turret 7, in this embodiment, includes a gimbal-mounted observation camera 9, capable of being manipulated for rotation about a vertical rotation axis z and also a horizontal axis x. This manipulation allows the camera within the turret to have a field of view in any direction. Of most concern is a view in the direction of arrow F which is the intended forward direction of travel of the air vehicle to which the turret 7 is fitted.

In order to reduce aerodynamic drag created by the turret 7 when the air vehicle is travelling in the direction of arrow F, a fairing 10 is mounted to the fuselage 5 in a position which would otherwise be occupied by turbulent air from the turret 7 as the air vehicle travels in the direction of arrow F. However, the fairing 10 when so fitted, obscures, or partially obscures, the view of the camera in the turret 7 when the camera is manipulated to view in the general direction of arrow R, i.e. a rearward view. In order to mitigate this problem, the fairing 10 can be retractable, collapsible, or re-positionable, so that the rearward view is not obscured permanently. In this case, the fairing 10 is retractable for storage within the fuselage 5, at least while the camera is viewing rearwardly.

The fairing 10 has a generally tapering shape including a taller end 12 (taller in the direction parallel to the axis z) which is adjacent the turret 7, and a thinner end 14 distal from the turret 7. The fairing 10 is attached to the fuselage 5 by means of a piano hinge 16 at the thinner end 14. In the position shown in FIG. 1, the width perpendicular to the x axis of the taller end 12 is approximately equal to the width of the turret. This means that the fairing provides good reduction of drag. In order that the fairing can be positioned as close as possible to the turret 7, the taller end 12 includes a concave region 18 such that the cylindrical form of the turret 7 is accepted into the concavity 18. In addition, the taller end 12 is generally curved and has a centre of arc approximately at the pivot axis of the hinge 16.

The fairing 10 is attached to a retraction mechanism shown generally at reference 20. This mechanism includes an electric drive 22 having an integral gear box 24, which drives a shaft 26 about arc y of approximately 180°. In the fairing-deployed position shown in FIG. 1, a pair of first bars 28 are positioned such that they are generally co-linear with a pair of second respective bars 30 pivotally attached to the free ends of the first bars 28. In this position the bars 28 and 30 force the fairing 10 generally away from the shaft 26 and into the said deployed position. Any free movement in the mechanism is resisted by springs 32 attached, at their one end to the bars 30 and at their other end to the fairing 10. In this position, the bars 28 and 30 gives a line of force which exerts little or no torque on the shaft 26 because the connecting points of first and second bars are in general alignment with the axis of the shaft 26 and the attachment points at the fairing 10. The alignment is such that the bars have a slight overcentre action and are held in place by springs 32. The gearbox 24 may, in addition, have sufficient internal friction to resist or prevent unpowered rotation of the shaft 26, for example caused by air pressure acting on the fairing 10.

In this view it can be seen that the fairing 10 has an outer wall 34 and a hollow interior. The outer wall 34 is stiffened by a stiffening frame 36 which extends generally perpendicular to the wall 34.

Figure 2:
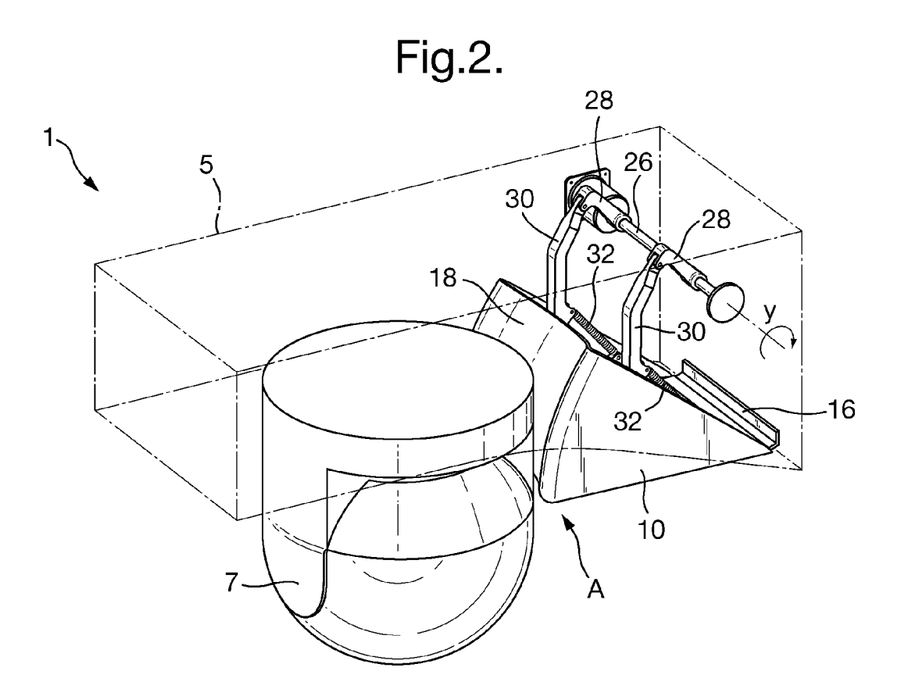
FIG. 2 shows the equipment shown in FIG. 1, wherein the fairing is in a semi-retracted position.

FIG. 2 shows the fairing 10 in a semi-retracted position following the rotation of the shaft 26 in the direction of arrow Y for approximately 90°. In this position it will be noted that the bars 30 and 28 are now at a relative angle of approximately 90° also. The movement of the shaft 26 causes the fairing 10 to move in the direction of arrow A, about hinge 16. In this figure, the concavity 18 is more clearly visible.

Figure 3:
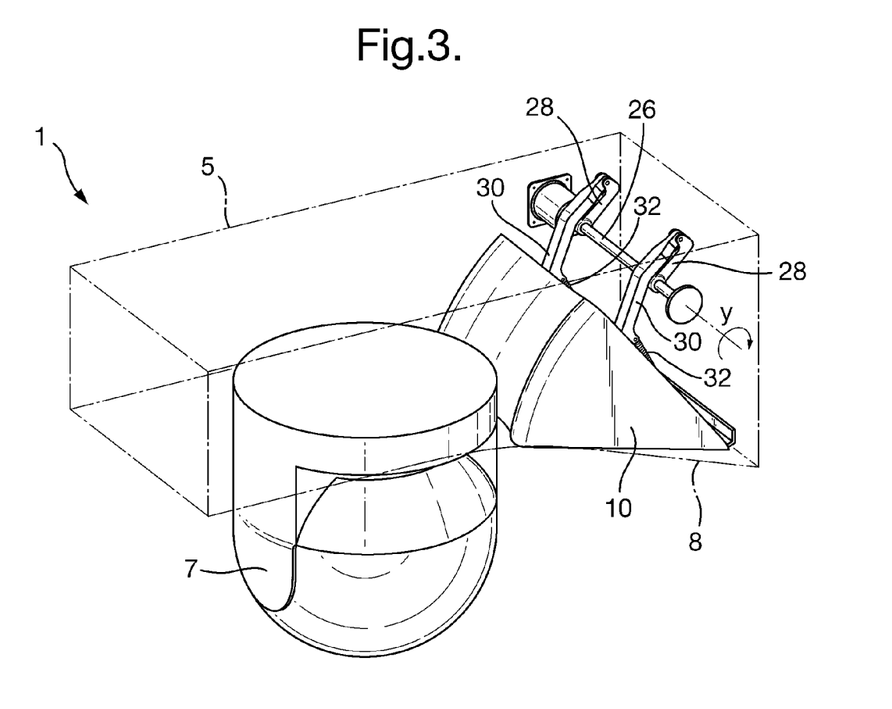
FIG. 3 shows the equipment shown in FIG. 1, wherein the fairing is fully retracted.

FIG. 3 shows the fairing 10 in its fully retracted position within the fuselage 5.

It will be noted that the bars 28 and 30 are again generally co-linear following further rotation of the shaft 26 in the direction of arrow Y. In this position, the springs 32 illustrated in FIG. 1 urge the bars 30 toward the shaft 26. Since the bars 30 are slightly cranked an overcentre mechanism is again provided in the retracted position and consequently the bars 28 and 30 are urged into their fairing-retracted positions illustrated by means of the springs 32.

Figure 4:
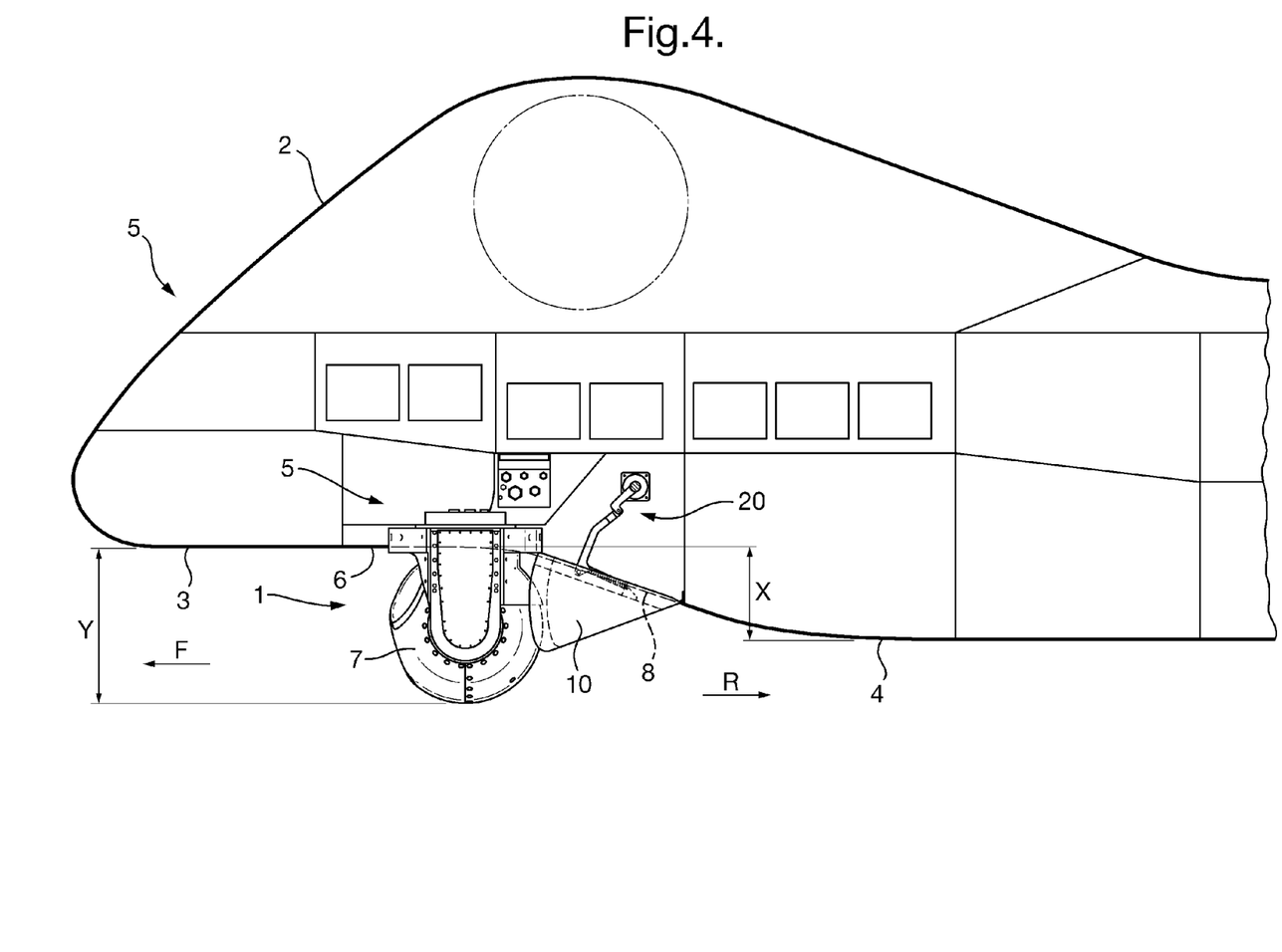
FIGS. 4, 5 and 6 show side views of the equipment illustrated in the previous figures, fitted to a UAV, in different positions.

In FIG. 3 the curvature 8 of the fuselage 5 is apparent at a region where the fairing 10 is retracted. This curvature is explained in more detail below. FIG. 4 shows a UAV front section 2, incorporating the fuselage 5, to which has been fitted the transmitting and/or receiving equipment 1. The exposed turret 7 is visible which has a field of view both forwards F and rearwards R. The drag reducing fairing 10 is illustrated in its deployed and operative position, behind the turret 7.

Figure 5:
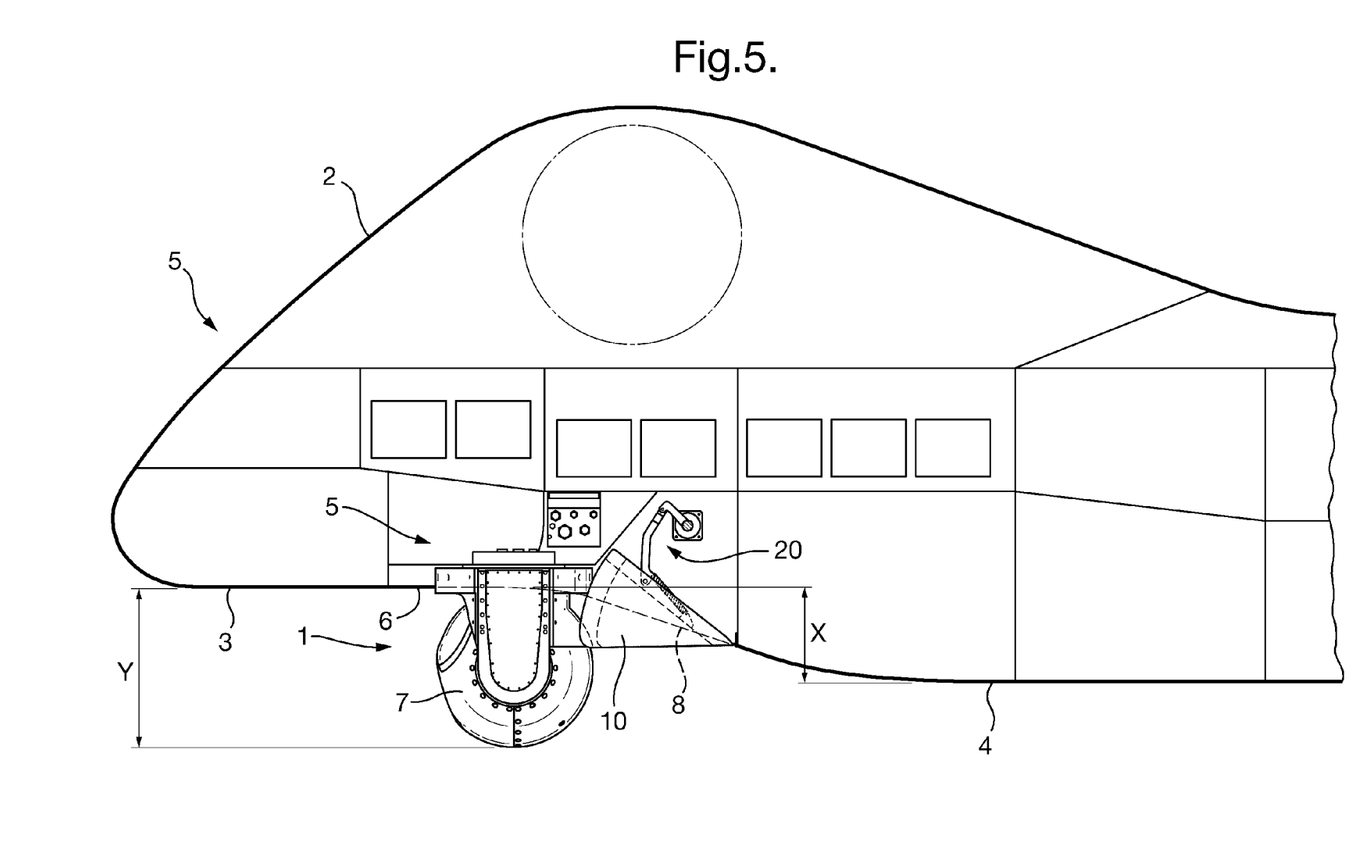

FIG. 5 shows the same view as that shown in FIG. 4 except that the fairing is partially retracted into the fuselage of the UAV 2.

Figure 6:
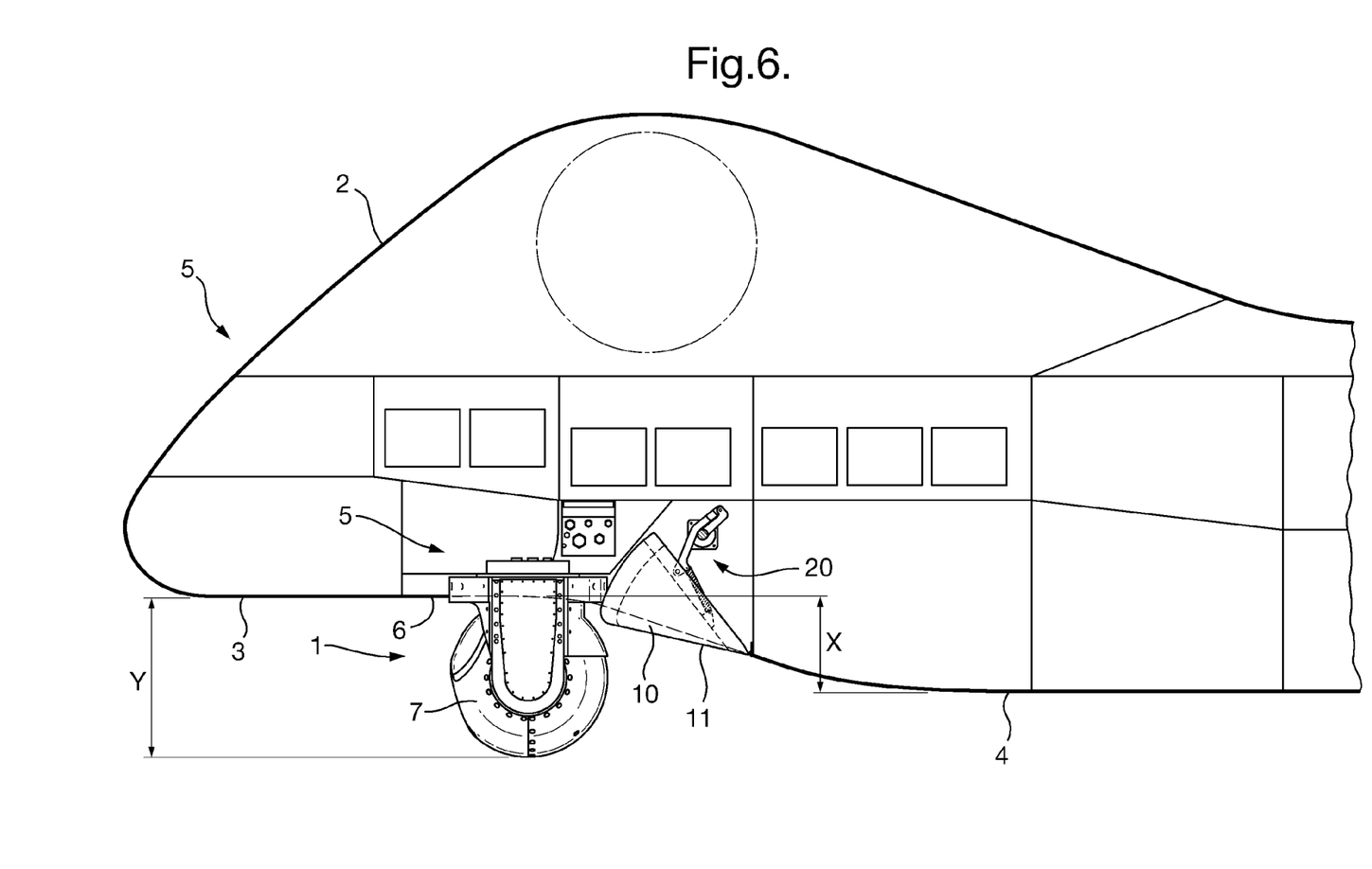

FIG. 6 shows the same view as that shown in FIG. 4 except that the fairing is now fully retracted.

In FIGS. 4, 5 and 6 the contour of the underside 6 of the fuselage 5 is not linear where the equipment 1 is mounted. The fuselage is shaped with an initial generally linear portion 3, in a direction fore to aft, and then curves downwardly immediately aft of the turret 7 mounting at curved intermediate portion 8, at the point where the fairing 10 is located. The fuselage then straightens to another aft linear portion 4, aft of the equipment 1. The initial and aft portions are generally parallel. Thus a slopped or stepped fuselage is provided, which slopes smoothly downwardly immediately aft of the turret 7. The reason for this sloped or stepped arrangement is to draw the fuselage down aft of the fairing 10 in order to reduce flow separation at the fairing 10. The offset or stepped distance X is less than the height Y of the turret 7, but greater than $\frac{1}{2}$ Y. This gives an adequate field of view for the camera of the turret 7, or for other transmitting and/or receiving device, but still reduces flow separation. The lower surface 11 (FIG. 6) of the fairing 10 follows approximately the curved portion 8 when the fairing 10 is retracted.

A linear or generally straight underside has been found to produce turbulence at higher airspeeds, downstream of the turret 7, and a fairing fitted to such a straight underside, would need to be approximately twice as long as the fairing 10 illustrated in order for that long fairing to have a similar affect on flow, if the underside were not sloped or stepped as shown.

Although one embodiment only of the invention has been described and illustrated, it will be readily apparent to the skilled addressee that many variants, modifications, additions or omissions are possible within the scope of the invention. For example, a generally cylindrical observation turret 7 has been illustrated which includes a hemispherical end. However, other transmitting and/or receiving devices could be used which have different shapes. For example, a spherical, elliptical or other rounded shape could be employed. Equally, a flat sided shape could be used. Equally a fairing having a different shape to that illustrated could be employed. Although the invention has been described in relation to turrets which include a camera 9, it will be readily apparent that devices other than cameras could be employed, for example infra-red detection devices or other electro-magnetic radiation sensors could be employed. Accordingly the term "transmitting and/or receiving" should be broadly interpreted herein to include not only the transmitting and/or receiving of light, but also transmitting and/or receiving of non-visible electromagnetic spectra, the detection or emission of other media such as air pressure waves and the receiving of returning emitted signals, or the like. The associated expression "field of view" should thus be interpreted accordingly. The term "air vehicle" used herein should be interpreted widely to include any air-borne object. The turret 7 and fairing 10 in the embodiment illustrated do not touch in use, although a fairing which touches the turret or other transmitting and/or receiving device is possible within the ambit of the invention.

The invention claimed is:

1. Equipment for at least one of transmitting and receiving configured for mounting to an intermediate portion of an air vehicle fuselage, said intermediate portion of said air vehicle fuselage includes, when viewed fore to aft, an underside having a substantially linear initial portion, a further substantially linear aft portion which is lower than said initial portion, and said intermediate portion being between said initial and aft portions, such that said initial portion will be forward of said equipment when mounted, and said aft portion will be aft of said at least one of transmitting and receiving equipment when mounted, said at least one of transmitting and receiving equipment comprising, in combination: a device for at least one of transmitting and receiving, having at least a forward field of view, said device being configured for mounting at said intermediate portion such that said device will extend away from said fuselage; and a fairing component separate from said fuselage and separate from said device for at least one of transmitting and receiving, configured to be pivotally mountable to said fuselage at said intermediate portion adjacent said device at a rearward side of said device for reducing aerodynamic drag, said fairing being retractable, collapsible or repositionable in flight to afford said device a rearward, or more effective rearward, field of view for said at least one of transmitting and receiving.

2. The at least one of transmitting and receiving equipment as claimed in claim 1, wherein said fairing is of a substantially tapering shape having a taller end adjacent or proximal said device and a thinner or shorter end away or distal from said device.

3. The at least one of transmitting and receiving equipment as claimed in claim 2, wherein said device has a horizontal width and said fairing, at least at a proximal end of said fairing, is approximately a same width as said device.

4. The at least one of transmitting and receiving equipment as claimed in claim 3, wherein said device comprises:
a cylindrical region including an axis which extends substantially downwardly when in use, and said fairing comprises, at a proximal end of said fairing, in a horizontal section, a concave region for accepting part of said cylindrical region.

5. The at least one of transmitting and receiving equipment as claimed in claim 3, wherein said fairing's proximal end is formed with a radius having a center of arc approximately at a hinge.

6. The at least one of transmitting and receiving equipment as claimed in claim 3, wherein said fairing comprises:
a stiffening frame, which is formed from members extending substantially transversely to a wall of said fairing.

7. The at least one of transmitting and receiving equipment as claimed in claim 1, wherein said fairing is configured with a retractable mount for retraction, at least partially, into said fuselage once mounted.

8. The at least one of transmitting and receiving equipment as claimed in claim 7, wherein said fairing comprises:
means of pivoting at a hinge at an aft thinner end of said fairing for retractable mounting.

9. The at least one of transmitting and receiving equipment as claimed in claim 1, wherein said fairing comprises:
an outer wall and is hollow.

10. The at least one of transmitting and receiving equipment as claimed claim 1, wherein, said fairing comprises:
a retraction mechanism.

11. The at least one of transmitting and receiving equipment as claimed in claim 10, wherein said retraction mechanism comprises:
an electric drive and pivoted bar arrangement.

12. The at least one of transmitting and receiving equipment as claimed in claim 11, wherein said arrangement comprises:
two bars pivotally interconnected at adjacent ends, a first of the bars being driveable in rotation by rotation of said electric drive, and a second of said bars being further pivotally connected to said fairing.

13. The at least one of transmitting and receiving equipment as claimed in claim 12, wherein rotation of said electric drive will cause the first of the bars to rotate about a rotational axis of said electric drive, and cause the second bar to move and thus pivot said fairing about a hinge.

14. The at least one of transmitting and receiving equipment as claimed in claim 12, wherein said pivoted bar arrangement comprises:
an overcentering spring for resisting movement of said retraction mechanism at least when said two bars are positioned in a fairing-retracted position.

15. The at least one of transmitting and receiving equipment as claimed in claim 10, wherein said mechanism comprises:
a gearbox.

16. An air vehicle in combination with said at least one of transmitting and receiving equipment according to claim 1, wherein said at least one of transmitting and receiving equipment is mounted to a fuselage of said air vehicle, and wherein said fuselage comprises:
an underside having a substantially linear initial portion, when viewed fore to aft, forward of said equipment, a further substantially linear aft portion, aft of said equipment which is lower than said initial portion, and an intermediate portion between said initial and aft portions, said equipment being mounted at said intermediate portion.

17. An air vehicle as claimed in claim 16, wherein said intermediate portion is smoothly curved and said fairing is retractable into said intermediate portion and, when so retracted has approximately a same outer profile as said intermediate portion.

18. The equipment of claim 1, wherein an offset distance X of said fuselage between said substantially linear initial portion and said substantially linear aft portion is less than a height Y of said device, but greater than ½ said height of said device, whereby flow separation at said fairing is reduced and rearward field of view of said device is maintained.

* * * * *